United States Patent
Farres et al.

(10) Patent No.: US 12,084,013 B2
(45) Date of Patent: Sep. 10, 2024

(54) VEHICLE BRAKING SYSTEM WITH COMPOUND MANAGEMENT FUNCTION

(71) Applicant: VOLVO TRUCK CORPORATION, Gothenburg (SE)

(72) Inventors: Lionel Farres, Heyrieux (FR); Jean Sébastien Carle, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 401 days.

(21) Appl. No.: 17/594,496

(22) PCT Filed: May 16, 2019

(86) PCT No.: PCT/EP2019/062689
§ 371 (c)(1),
(2) Date: Oct. 19, 2021

(87) PCT Pub. No.: WO2020/228963
PCT Pub. Date: Nov. 19, 2020

(65) Prior Publication Data
US 2022/0194343 A1    Jun. 23, 2022

(51) Int. Cl.
*B60T 13/68*      (2006.01)
*B60T 13/66*      (2006.01)
*B60T 17/08*      (2006.01)

(52) U.S. Cl.
CPC .......... *B60T 13/683* (2013.01); *B60T 13/662* (2013.01); *B60T 17/083* (2013.01)

(58) Field of Classification Search
CPC .... B60T 13/683; B60T 17/083; B60T 13/662; B60T 13/261
See application file for complete search history.

(56) References Cited

U.S. PATENT DOCUMENTS

| 5,118,165 A | 6/1992 | Latvala |
| 2020/0070795 A1* | 3/2020 | Van Thiel ............. B60T 13/662 |

(Continued)

FOREIGN PATENT DOCUMENTS

| EP | 0020862 A1 | 1/1981 |
| WO | 9106458 A1 | 5/1991 |
| WO | 2015092470 A1 | 6/2015 |

OTHER PUBLICATIONS

WO document No. WO2012038498 to Treppenhauer et al. published on Mar. 29, 2012.*

(Continued)

*Primary Examiner* — Pamela Rodriguez
(74) *Attorney, Agent, or Firm* — Venable LLP; Jeffri A. Kaminski

(57) ABSTRACT

A control method for controlling a spring loaded brake actuator (9) comprising a first chamber (Ch1) to receive a parking brake pressure (PBR) acting against a main spring (92), and a second chamber (Ch2) to receive a service brake pressure (SB) for applying a service brake force, the method comprising a circumstantial selection of one control law among a set of control laws comprising two or more compound control laws: —where the first compound control law (CL1), known as anti-compound mode, is such the service brake pressure (SB) is electronically controlled such that the resulting total braking force (F) does not exceed a first upper limit (UL1) corresponding to the force of the main spring (92) when the parking brake pressure (PBR) is substantially null, —where the second compound control law (CL2), known as controlled-compound mode, is such that the service brake pressure (SB) is electronically controlled such that the resulting total braking force (F) does not exceed a second upper limit (UL2) higher than the first upper limit.

24 Claims, 5 Drawing Sheets

(56) References Cited

U.S. PATENT DOCUMENTS

2020/0114892 A1\* 4/2020 Boyce .................... F16D 65/16
2022/0250598 A1\* 8/2022 Farres .................. B60T 17/083

OTHER PUBLICATIONS

European Patent No. EP 4063208 to Vikstrom et al published on Sep. 28, 2022.\*
International Search Report and Written Opinion dated Feb. 24, 2020 in corresponding International PCT Application No. PCT/EP2019/062689, 9 pages.

\* cited by examiner

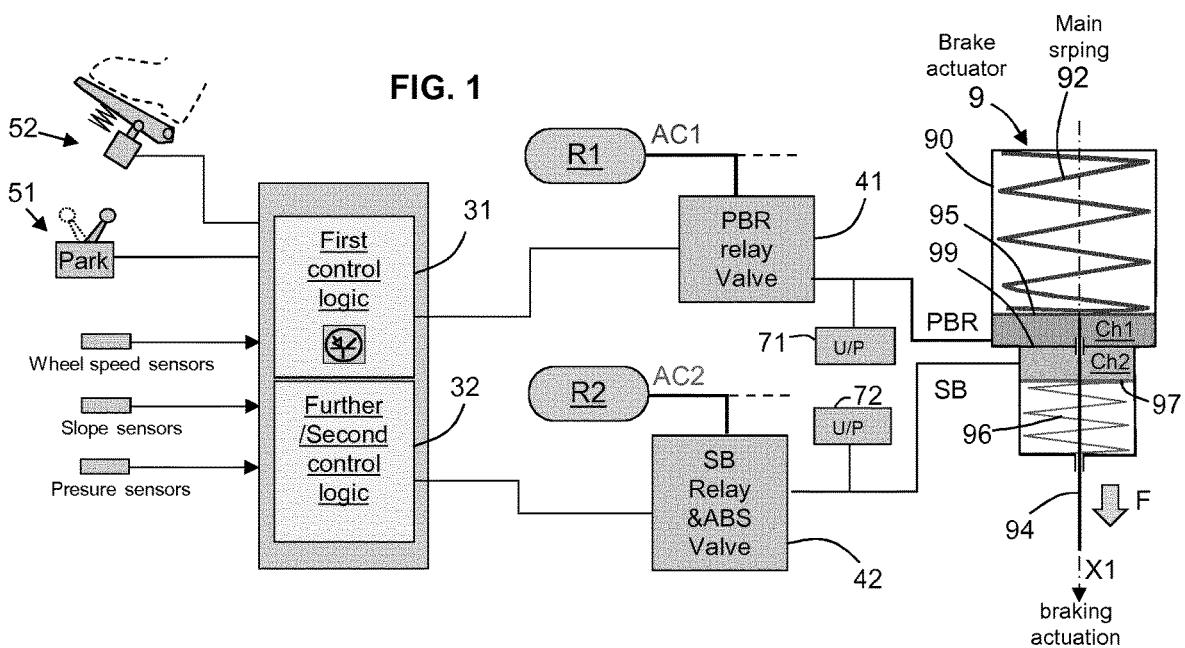
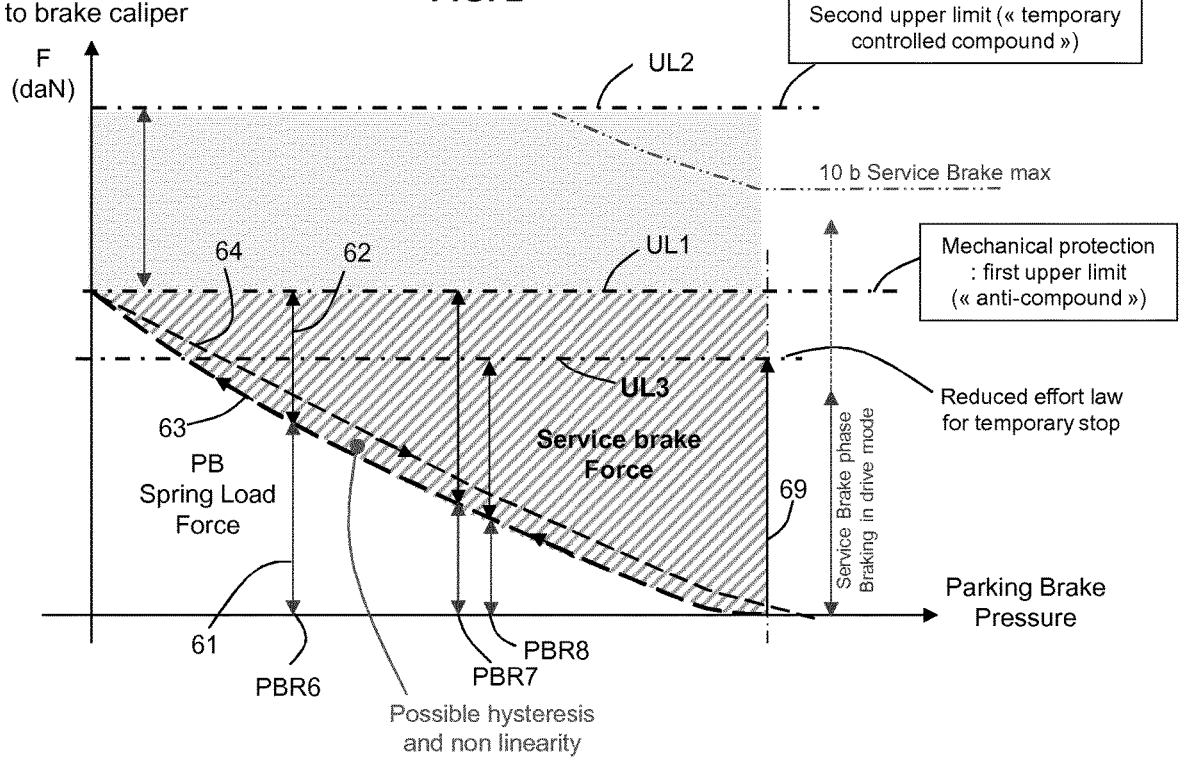

VEHICLE BRAKING SYSTEM WITH COMPOUND MANAGEMENT FUNCTION

CROSS-REFERENCE TO RELATED APPLICATIONS

This application is a U.S. National Stage application of PCT/EP2019/062689, filed May 16, 2019, and published on Nov. 19, 2020, as WO 2020/228963 A1, all of which is hereby incorporated by reference in its entirety.

FIELD OF THE INVENTION

This invention relates to vehicle braking systems with a compound management function. This concerns particularly electronically controlled pneumatic brake systems for automotive vehicles and particularly for heavy duty vehicles (trucks, buses, construction equipments, offroad, . . . ). The invention is directed to method and systems to implement such compound management function.

This invention also relates to an automotive vehicle equipped with such a system.

BACKGROUND OF THE DISCLOSURE

In the field of heavy duty vehicles, pneumatic brake systems commonly use one or more spring brake actuator(s) which combine a park brake function and a service brake function. Both park brake function and service brake function act in conjunction/parallel on an output rod that applies a braking force on a brake caliper.

EP0020862 discloses an example of a combined park brake and service brake actuator.

The notion of 'compounding' denotes simultaneous application of both park brake function and service brake function, added one another simultaneously to the rod and the brake caliper. This leads to an excessive force that is known to possibly cause a mechanical damage to the brake components and/or possibly cause a premature wear of the brake components.

Therefore, trucks manufacturers have developed a so-called 'anti-compound' function. The 'anti-compound' function is designed to prevent addition of the effort exerted by the parking brake spring together with the effort applied the pressurized piston of the service brake.

In the known art, the 'anti-compound' function is realized with a pneumatic arrangement, for example a select-high valve for supplying the park brake pneumatic chamber, such that when a service brake pressure is applied to the service brake pneumatic chamber, it is also applied simultaneously to the park brake pneumatic chamber to result in a compensation effect such the total effort applied to the caliper does not exceed the park brake spring force.

However, the inventors have noticed that regarding the transients, park brake and service brake do not react with the same real time characteristics, and then the compensation effect is not accurate for transitions. Also, it has been contemplated that the 'anti-compound' function can be problematic in very specific circumstances, in which it could be beneficial to apply a force beyond the park brake spring force.

Therefore, the inventors have endeavored to find improved solution for handling the 'anti-compound' function.

SUMMARY OF THE DISCLOSURE

According to one aspect of the present invention, it is disclosed a control method for controlling a spring loaded brake actuator comprising a first chamber (Ch1) to receive a parking brake pressure (PBR) acting against a main spring, exerting a parking brake force, and a second chamber (Ch2) to receive a service brake pressure (SB) for applying a service brake force, the spring loaded brake actuator being configured to apply a total braking force (F) to a brake caliper, which is the sum of the service brake force and the parking brake force, the method comprising a circumstantial selection of one control law among a set of control laws comprising at least first and second compound control laws:

where the first compound control law (CL1), known as anti-compound mode, is such that at least the service brake pressure (SB) is electronically controlled such that the resulting total braking force (F) does not exceed a first upper limit (UL1) corresponding to the force of the main spring when the parking brake pressure (PBR) is substantially null, where the second compound control law (CL2), known as controlled-compound mode, is such that at least the service brake pressure (SB) is electronically controlled such that the resulting total braking force (F) does not exceed a second upper limit (UL2) higher than the first upper limit.

Thanks to this arrangement, the overall wear of the brake components can be minimized, even though in particular circumstances, which in practice remain scarce, the main spring force can be exceeded on purpose, under the second compound control law (controlled-compound mode).

In particular, when the first compound control law is selected (anti-compound mode), the braking force is of particular interest for standstill-to-drive and drive-to-standstill transitions, and the promoted control method can reliably prevent inadvertent/undesired overshoots regarding the brake force and also can reliably guarantee sufficient braking force. We note here that the term 'standstill' refers to a null speed condition (0 km/h).

By the term "main spring", it shall be understood the spring housed in the brake actuator, which applies the parking brake force even when no pressure is available or no pressure is provided. There may be provided another spring to bias the service brake piston, but it is smaller and different from the main spring.

In various embodiments of the invention, one may possibly have recourse in addition to one and/or other of the following arrangements, taken alone or in combination.

According to one aspect, the method further comprises a first border compound control law (BCL1) for a transition from a park brake released state to a park brake applied state or for a transition from a park brake applied state to a park brake released state, where the parking brake pressure (PBR) and the service brake pressure (SB) are balanced such that the total braking force (F) equals the first upper limit (UL1) corresponding to the force of the main spring when the parking brake pressure (PBR) is substantially null. Thereby, when the first compound control law is selected (anti-compound mode), the braking force is of particular interest for transition from a park brake released state to a park brake applied state or conversely for a transition from a park brake applied state to a park brake released state, and the promoted control method can reliably prevent undesired overshoots regarding the brake force and also can reliably guarantee sufficient braking force.

Advantageously, there is provided a real time control for the balance between the parking brake pressure and the service brake pressure, such that the total braking force reaches the first upper limit without exceeding it. Different response times between parking brake and service brake are therefore compensated for.

According to one aspect, the set of control laws may further comprise a drive domain control law (DCL) wherein the service brake pressure (SB) is controlled with no dependence from the parking brake pressure (PBR), the drive domain control law (DCL) being selected when the vehicle is under normal driving conditions.

Thereby, the compound laws are advantageously rendered inoperative when the vehicle is under normal driving conditions. This improves overall reliability and resilience against inadvertent malfunction. Only ABS function can shortly and timely limit the service brake pressure but the service brake pressure cannot be limited based on the parking brake pressure in driving conditions. Dependability is thus improved.

The notion of "normal driving conditions" includes generally conditions where vehicle speed is substantially above 0 km/h.

According to one aspect, the set of control laws may further comprise a third compound control law (CL3), wherein at least the service brake pressure (SB) is electronically controlled such that the resulting braking force (F) remains below a third upper limit (UL3) lower than the first upper limit (UL1).

This corresponds to a "low anti-compound" mode, which may be used for short term stops (i.e. "work brake" in the truck driver language), on flat ground or on small sloped ground.

Preferably, UL3 may be in the order of magnitude of 50% of UL1. This allows to further spare the brakes, i.e. the overall wear of the brake components can be further minimized if compared with the case when full park brake is applied at each work stop.

According to one aspect, in the third compound control law, it can be envision that the parking brake pressure (PBR) is electronically controlled by a logic unit so that the parking brake force is inferior to the force of the main spring when the parking brake pressure (PBR) is substantially null.

According to one aspect, the third compound control law (CL3) is selected only when the vehicle is parked on a flat surface or almost flat surface, with a slope less than 3%, or with a slope less than 2%. This is usually the case on most factory premises where the truck loads/unloads goods.

According to one aspect, the control of service brake pressure (SB) is performed through software and the circumstantial selection of one control law among a set of control laws takes into account various operating and environmental conditions including at least vehicle speed, ground slope at parking place, temperature and wind conditions, and optionally load of the tractor and/or load of the carrier and/or load of the trailer. Whereby the switch from one mode to another is made simple and easy to control. The control is rendered flexible.

According to one aspect, the control of the parking brake pressure (PBR) is also performed through software. Control of parking brake through software allows flexible behavior and also allows diagnostic functions to be implemented.

According to one aspect, the circumstantial selection of one control law among a set of control laws is preferably performed in a real-time fashion, with a decision making process taking less than 1 second, preferably mess than 0.5 second. Whereby, the switch from first compound control to law second compound control law (and vice versa) can be very fast.

According to one aspect, there may be provided, stored in a memory, a first calibration function FSP=F1 (PBR) representing the force exerted by the main spring as a function of parking brake pressure (PBR). Pressure and force values can be linked by the function (easy correspondence, the computation can be performed in the pressure domain or in the force domain or both). Non-linearity and hysteresis can be compensated for. The calibration function and process can rely on look-up table, individual calibration, self-learning, auto-calibrating process, etc. . . . . .

According to one aspect, there may be provided, stored in a memory, a second calibration function FSB=F2 (SB) representing the force exerted by the service brake chamber as a function of the service brake pressure (SB). Pressure and force values can be linked by the function (easy correspondence, the computation can be performed in the pressure domain or in the force domain or both).

According to one aspect, the logic may proceed as follows: the parking brake pressure (PBR) is first determined, either directly measured or indirectly assessed, then the force exerted by the main spring as a function of parking brake pressure is determined therefrom, and then a remaining effort up to the currently prevailing limit (UL1,UL2, UL3) is determined, and then a maximum service brake pressure (SB) is then computed therefrom. This turns out to be a simple and reliable method to arrive to a limitation of the service brake pressure to said maximum service brake pressure. Since the Park Brake is slower to react than the service brake, the promoted method takes the slower system, i.e. the park brake, as the leading system and adjust accordingly the control on the faster system, i.e. the service brake.

According to one aspect, respective maximum values for service brake denoted SB1max, SB2max and optionally SB3max are calculated as follows:

$$SB1max = F2^{-1}[UL1 - F1(PBR)],$$

$$SB2max = F2^{-1}[UL2 - F1(PBR)],$$

and optionally $SB3max = F2^{-1}[UL3 - F1(PBR)]$

According to one further aspect, maximum value for service brake denoted SB1max under first compound control law (CL1) can be calculated as follows:

$$SB1max = KA \cdot PBR + KC.$$

Furthermore, under first border compound control law (BCL1), service brake pressure can be calculated as follows: $SB(t)=KA \cdot PBR(t)+KC$. This calculation is made in real time (dynamically), such that the balance between parking brake and service brake exhibits no time lag.

According to one aspect, the second compound control law (CL2) is selected if the foot brake pedal is depressed beyond a predetermined threshold (TH1).

Advantageously, if the driver happens to stop on a steep slope, addition of parking brake force and service brake with foot pedal depressed allows maintaining the truck still.

"Depressed beyond a predetermined threshold" can be evaluated in terms of percentage of the total foot pedal full stroke, for example more than 80% of the total pedal stroke. "depressed beyond a predetermined threshold" can alternatively be evaluated in terms of equivalent pressure demand.

According to one aspect, the first compound control law (CL1) is selected again when the service brake applied by the driver is (completely) released below a defined pedal position threshold, which may be identical or preferably lower that the predetermined threshold TH1 mentioned above. For example, the defined pedal position threshold could be at 50% of the total pedal stroke.

According to one aspect, the first compound control law (CL1) is selected only when the vehicle is at standstill or when the vehicle speed is below a low speed threshold, e.g. 12 km/h, (almost at standstill). Therefore, the compound control law remains inoperative as long as the vehicle is under normal driving conditions. Only when the vehicle is at standstill or almost at standstill, the anti-compound logic can enter into action.

According to one aspect, the parking brake pressure (PBR) is controlled by a first control entity and the service brake pressure (SB) is controlled either by the same first control entity.

This improves optimization and cost effectiveness.

According to one aspect, the parking brake pressure (PBR) is controlled by a first control entity and the service brake pressure (SB) is controlled either by a further control entity, the further control logic being preferably hardware-wise independent from the first control entity. Thereby, the required level of dependability and reliability can be reached.

According to one aspect, the first control entity is hosted in a Electronic Parking Brake (EPB) control unit of a heavy duty vehicle, and the further control entity is hosted in the Electronic Parking Brake (EPB) control unit. Cost effectiveness of the solution is thereby achieved.

According to one aspect, the first upper limit (UL1), the second upper limit (UL2) and, if appropriate, the third upper limit (UL3) are predetermined values based on the characteristics of the spring loaded brake actuator (9) and/or a fatigue objective to be achieved (truck life).

According to one aspect, the first compound control law (CL1), the service brake pressure (SB) is controlled by a control entity, independently of the position of the brake pedal (52). Said otherwise, we use here a brake by wire solution, which allows much flexibility.

According to one aspect, the second upper limit (UL2) is strictly inferior to the sum of the force of the main spring when the parking brake pressure (PBR) is null (maximal parking brake force) and of the maximum force that the service brake actuator is capable of applying under normal conditions (to be defined).

Preferably, UL2 may be defined by 100% of maximum park brake force+60% of maximum service brake force Alternatively UL2 may be defined by 150% of the spring force of the main spring when the parking brake pressure (PBR) is substantially null.

According to one aspect, the present disclosure is also directed to a braking system for controlling a spring loaded brake actuator (9) comprising a first chamber (Ch1) to receive a parking brake pressure (PBR) acting against a main spring exerting a parking brake force, and a second chamber (Ch2) to receive a service brake pressure (SB) for applying a service brake force, the spring loaded brake actuator being configured to apply a total braking force (F) to a brake caliper which is the sum of the service brake force and the parking brake force, and at least a control unit, the control unit being configured to select of one control law among a set of control laws comprising at least first and second compound control laws:
  where the first compound control law (CL1), known as anti-compound mode, is such that the parking brake pressure (PBR) and the service brake pressure (SB) are controlled such that the resulting total braking force (F) does not exceed a first upper limit (UL1) corresponding to the main spring force,
  where the second compound control law (CL2), known as controlled-compound mode, is such that the parking brake pressure (PBR) and the service brake pressure (SB) are controlled such that the resulting total braking force (F) does not exceed a second upper limit (UL2) higher than the first upper limit.

Same benefits as per the method disclosed above can advantageously be obtained.

According to one aspect, the parking brake pressure (PBR) is controlled by a first control unit (31), and the service brake pressure (SB) is controlled by the same control unit. Cost effectiveness of the solution is thereby achieved.

According to an alternative solution, the parking brake pressure (PBR) is controlled by a first control unit (31), and the service brake pressure (SB) is controlled by a further control unit (32), the further control logic being preferably hardware-wise independent from the first control logic. Thereby, the required level of dependability and reliability can be reached.

The system may further comprise a pressure sensor (71) for sensing parking brake pressure (PBR), and optionally a second pressure sensor (72) for sensing the service brake pressure (SB The invention is also directed to a vehicle including a brake system as described above.

According to another aspect, there is provided a control method for controlling a spring loaded brake actuator (9) comprising a first chamber (Ch1) to receive a parking brake pressure (PBR) acting against a main spring, and a second chamber (Ch2) to receive a service brake pressure (SB), the spring loaded brake actuator being configured to apply a total braking force (F) to a brake caliper, the method comprising:
  /Z1/—determine a current upper limit (UL(t)) of the total braking force (F) applied to the brake caliper, admissible according to current circumstances,
  /Z2/—determine a current parking brake pressure (PBR),
  /Z3/—determine a force exerted by the main spring as a function of parking brake pressure (PBR),
  /Z4/—determine a remaining effort up to the prevailing current upper limit (UL(t)),
  /Z5/—determine a current maximum service brake pressure (SB) such that the resulting total braking force (F) does not exceed the currently prevailing upper limit (UL(t)),
  /Z6/—limit the service brake pressure (SB) with the current maximum service brake pressure (SB).

Advantageously, the current upper limit (UL(t)) is computed continuously. UL(t) may be defined according to a durability target for the brake system and the brake components.

There may be provided real-time looped iteration of steps /Z1/ to /Z6/.

BRIEF DESCRIPTION OF THE DRAWINGS

Other features and advantages of the invention appear from the following detailed description of two of its embodiments, given by way of non-limiting example, and with reference to the accompanying drawings, in which:

FIG. 1 illustrates a diagrammatical circuit layout of an electro-pneumatic braking system for controlling a spring loaded brake actuator according to the invention, FIG. 2 shows a chart exhibiting at X-axis the parking brake pressure and at Y-axis the force applied to brake caliper, with various upper limits, notably regarding mechanical protection.

DETAILED DESCRIPTION OF THE DISCLOSURE

In the figures, the same references denote identical or similar elements.

Overview and Brake Actuator

Figure 6:
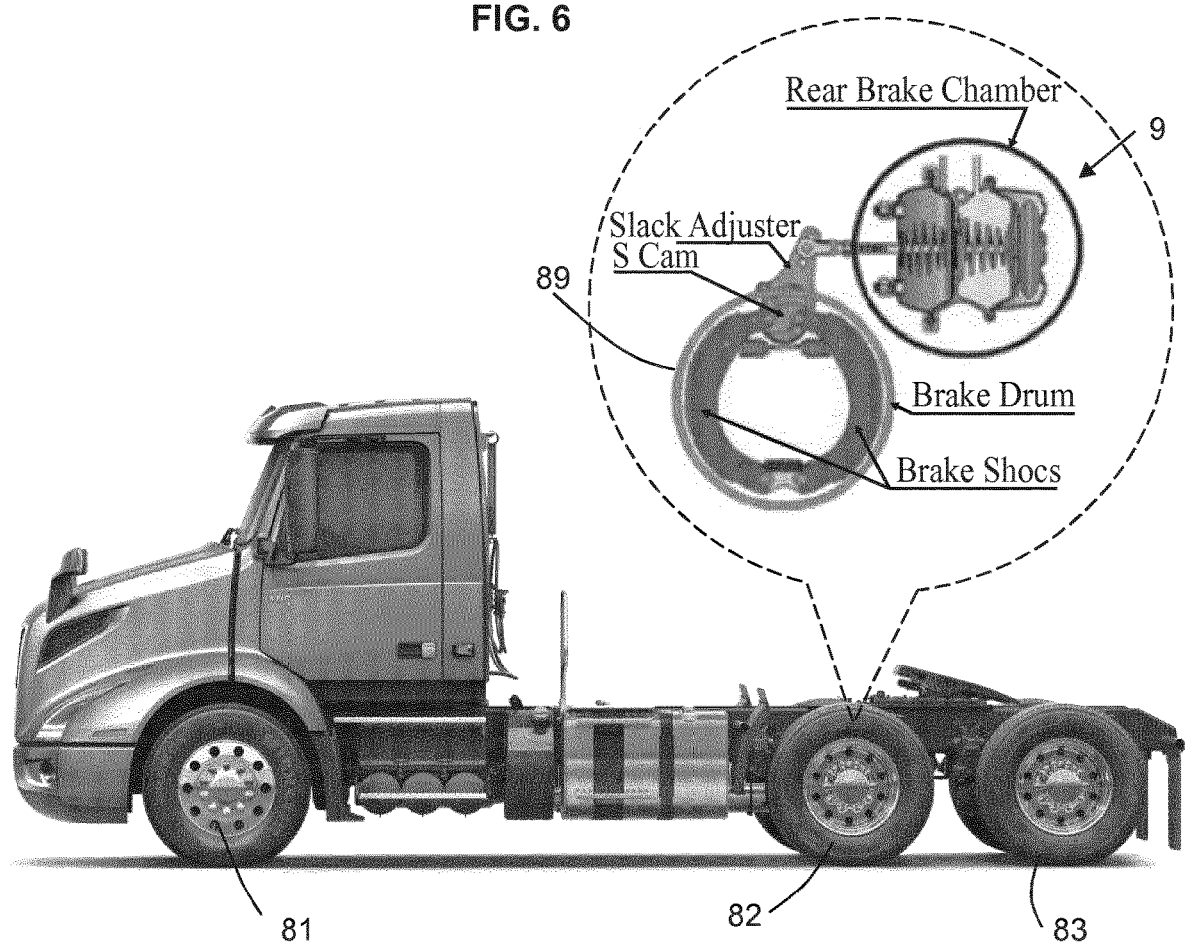
FIG. 6 illustrates diagrammatically a truck together with one its brake assembly shown schematically.

FIG. 1 shows a diagrammatical circuit layout of an electro-pneumatic braking system for a truck, only the relevant parts of it are shown. FIG. 6 illustrates in a non-limiting manner a truck with three axles, a front steering axle 81 and two rear axles 82, 83.

The proposed configuration is also valid for any kind of heavy-duty vehicles including buses and construction vehicles. The truck considered here can be the traction unit in a tractor/trailer configuration or it can be a utility 'carrier' truck.

There are various brake actuators, one per wheel or twinned wheels and/or one per axles, as known per se. Each brake actuator 9 is mechanically coupled to a brake mechanism 89.

Some brake actuators include a park brake function which is of particular interest in the following.

As shown at FIG. 1, there is provided a spring loaded brake actuator 9, formed generally as a cylinder having an axis X1. Casing/housing 90 forms an enclosure having two chambers separated by a wall and an output rod detailed below.

The spring loaded brake actuator 9 includes a main spring 92. The main spring 92 is housed in a first chamber Ch1 of the brake actuator, one end of the main spring abuts on the housing back end and the other end pushes a piston denoted 95. The piston 95 is rigidly coupled to an actuation rod 94. The actuation rod 94 applies a force denoted F to a brake caliper (not shown).

The main spring 92 exerts a parking brake force when no pneumatic pressure prevails in the first chamber Ch1, which explains the term "spring loaded" brake actuator. Said otherwise, the by-default state is a braked state. Pneumatic pressure denoted PBR pushes back the piston 95 against the main spring 92.

The spring loaded brake actuator 9 also comprises a second chamber Ch2.

There is provided a second piston 97. Pneumatic pressure can be supplied to the second chamber Ch2 to push the second piston 97 in the direction of positive braking.

Further there is provided another spring 96 (optional) for biasing the service brake piston. The piston 97 is rigidly coupled to the actuation rod 94. The actuation rod 94 takes therefore force from the first piston 95 and the second piston 97 (addition of efforts).

Hydraulic supply instead of pneumatic supply for the second chamber Ch2 is also contemplated. Said otherwise, the fluid used for the service brake can be pressurized oil instead of compressed air.

The second chamber Ch2 exhibits usually a smaller volume than the first chamber Ch1. The second chamber Ch2 may exhibit a smaller diameter than the first chamber Ch1. Likewise, the axial length of the second chamber Ch2 may be smaller than the axial length of the first chamber Ch1.

The second spring 96 is usually smaller and different from the main spring 92.

Electro Pneumatic Arrangement

In the shown example, the first chamber Ch1 is supplied with compressed air from a pipe coupled to the output of a first relay valve 41. This first relay valve 41 is of a type known per se, thus not described in details here. Following to the control side setpoint (pneumatic or electro-pneumatic), the output supplies air to the first chamber Ch1 or drains the first chamber to the atmosphere, or even maintains the current pressure.

The second chamber Ch2 is supplied with compressed air from another pipe coupled to the output of a second relay valve 42. Following to the control side setpoint (pneumatic or electro-pneumatic), the output of the second relay valve 42 supplies air to the second chamber Ch2 or drains the second chamber to the atmosphere, or even maintains the current pressure. It should be noted that this second relay valve 42 may be integrated into a so-called EBS device including an ABS function.

In the shown example, the first relay valve 41 is supplied with compressed air denoted AC1 from a reservoir R1. The second relay valve 42 is supplied with compressed air denoted AC2 from a reservoir R2. R2 may be same as R1; AC2 may be same as AC1.

The first relay valve 41 is controlled from a first control unit denoted 31. The second relay valve 42 is controlled from a second control unit denoted 32. The first control unit 31 hosts a first control entity (likewise called "logic unit" or "control logic"). The second control unit 32 hosts a second control entity.

In one embodiment, the first control unit and the second control unit are hosted in a unit called Electronic Parking Brake (EPB) control unit in charge of the features of control and monitoring of the parking brake function.

In another embodiment, the first control unit is hosted in the EPB control unit whereas the second control unit is hosted in the so-called 'EBS' device distinct from the Electronic Parking Brake.

In both cases, it is preferred that first and second control units be partially of totally independent from a hardware standpoint, although not necessary.

As shown at FIG. 1, there are provided two driver interface units, namely a foot brake pedal 52 and a park brake control device, which, in the example, is a lever 51. Obviously, the invention also applies to any other park brake control device, such as a manual switch or a pull tab.

The two driver interface units deliver information to the first and second control units, possibly in a redundant manner, such information may be a pneumatic pressure and/or an electrical signal, both for the foot brake pedal 52 and the park brake lever 51.

There are provided various other sensors, including wheel speed sensors (possibly by axle if relevant), pressure sensors, slope sensor. There may be provided additionally a load sensor, a driver seat occupation sensor, a video camera. There may be provided one or more truck load sensor(s), notably for carrier-type trucks.

In the overall system, there may be provided additionally autonomous drive controllers (not illustrated) which interact with the first and second control units to deliver controls for the overall brake function.

In the promoted configuration, the service brake pressure SB is electronically controlled.

Said otherwise, the service brake pressure SB is controlled by a control entity, according to a brake-by-wire solution, according to the physical position of the brake pedal 52, through a software layer; therefore the service brake pressure SB is not directly dependent on the position of the brake pedal. In other words, the service brake pressure SB does not only depend on the position of the brake pedal.

Compound Management and Control Laws

In FIG. 2, the X-axis denotes the parking brake pressure PBR and the Y-axis denotes the force F applied to brake caliper.

The total braking force F applied to the brake caliper is the sum of the service brake force and the parking brake force.

In one illustrative example, when the parking brake pressure PBR is equal to PBR6, the force exerted on the caliper is denoted 61, ranging from 0 to a curve denoted 63 which is to be discussed below. An additional service brake force denoted 62 can be added to the parking brake force, here up to a predefined level UL1.

There are shown various upper limits, denoted UL1, UL2, UL3, with regard to the mechanical protection and mechanical wear of the brake components.

UL1 corresponds to the force of the main spring 92 when the parking brake pressure (PBR) is substantially null.

UL2 corresponds to another limit, higher than the first upper limit UL1; as stated later UL2 is used for controlled compound configuration.

UL3 corresponds to another limit lower than the first upper limit UL1. UL3 corresponds to a "low anti-compound" mode, which may be used for short term stops (i.e. "work brake" in the truck driver language), on flat ground or nearly flat grounds.

Figure 3:
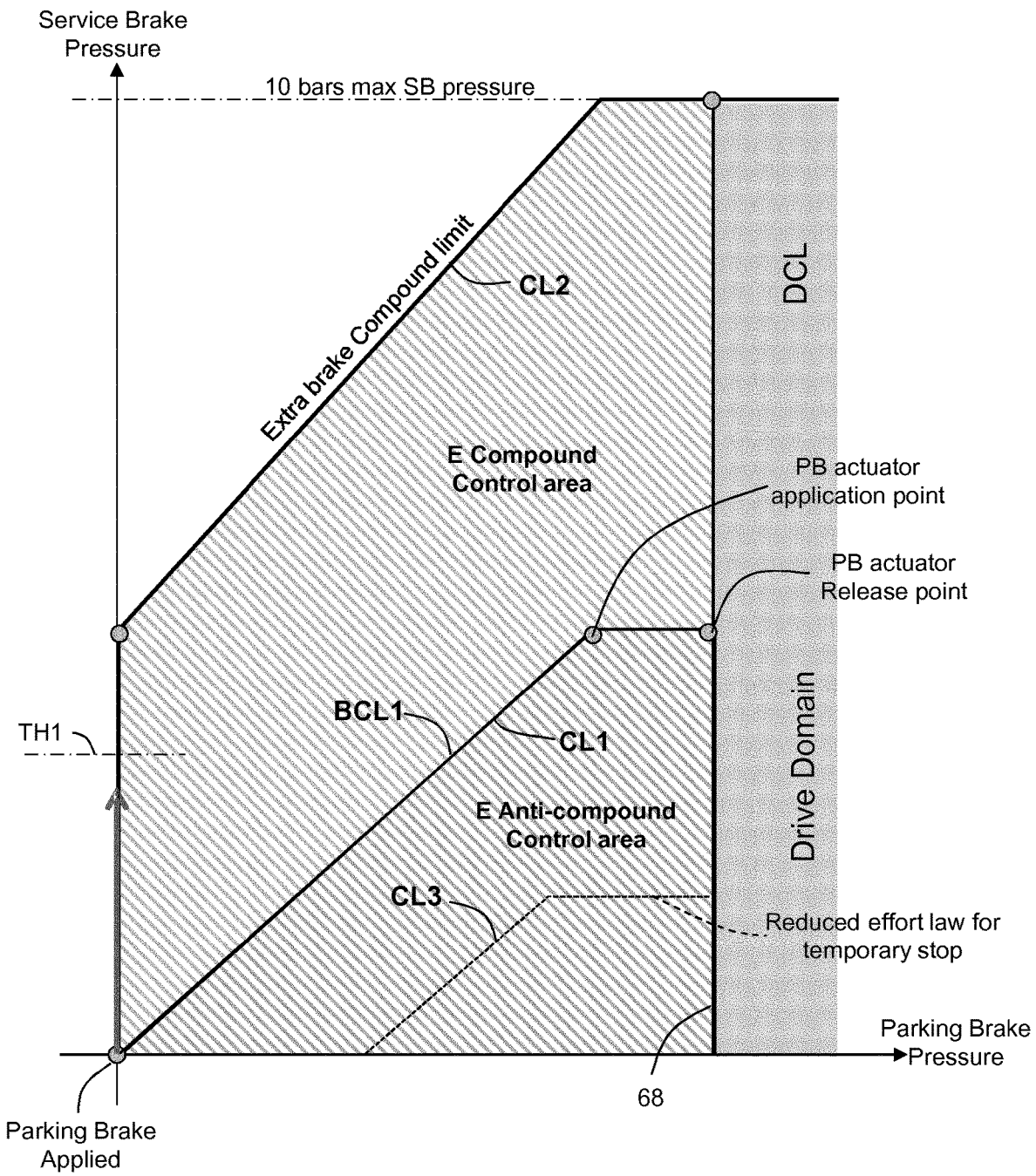
FIG. 3 shows a chart exhibiting at X-axis the parking brake pressure and at Y-axis the service brake pressure, with various control laws.

In FIG. 3, the X-axis denotes the parking brake pressure PBR and the Y-axis denotes the service brake pressure SB. As shown, there are provided a set of control laws discussed below.

There is provided a first compound control law CL1 defined by the service brake pressure SB electronically controlled depending on the parking brake pressure PBR such that the resulting total braking force F does not exceed the first upper limit UL1. The first compound control law CL1 is known as "anti-compound" mode.

There is provided a first border compound control law, denoted BCL1, consisting in electronically controlling the service brake pressure SB (depending on the parking brake pressure PBR), such that the resulting total braking force F equals the first upper limit UL1.

The "anti-compound" mode is defined by the area situated below the curve denoted BCL1. The curve BCL1 denotes an accurate adjustment of the total brake force on the main spring force all along the application and/or release of the park brake.

Since the Park Brake is slower to react than the service brake, the control logic takes the slower system as the leading system and adjust accordingly the control on the faster system, i.e. the service brake, to follow in a real time fashion the curve BCL1. We avoid therefore any overshoot or undershoot regarding the effort exerted on the brake caliper along the application and/or release of the park brake. Some time lag differences (PBR vs SB pressure) known in the prior art are therefore eliminated.

Figure 5A:
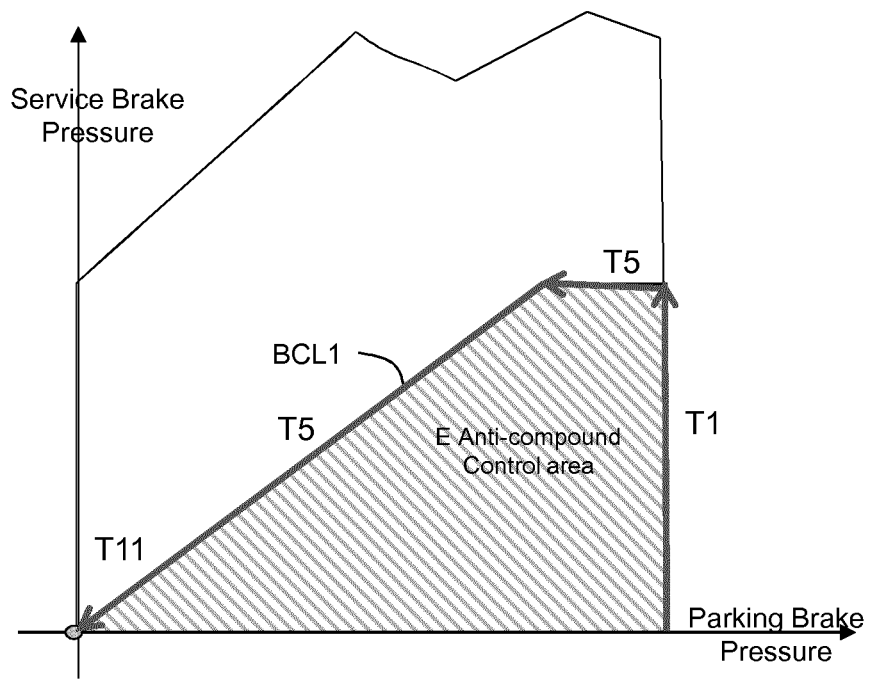
FIGS. 5A and 5B illustrate respectively a transition from a park brake released state to a park brake applied state and a transition from a park brake applied state to a park brake released state.
Figure 5B:
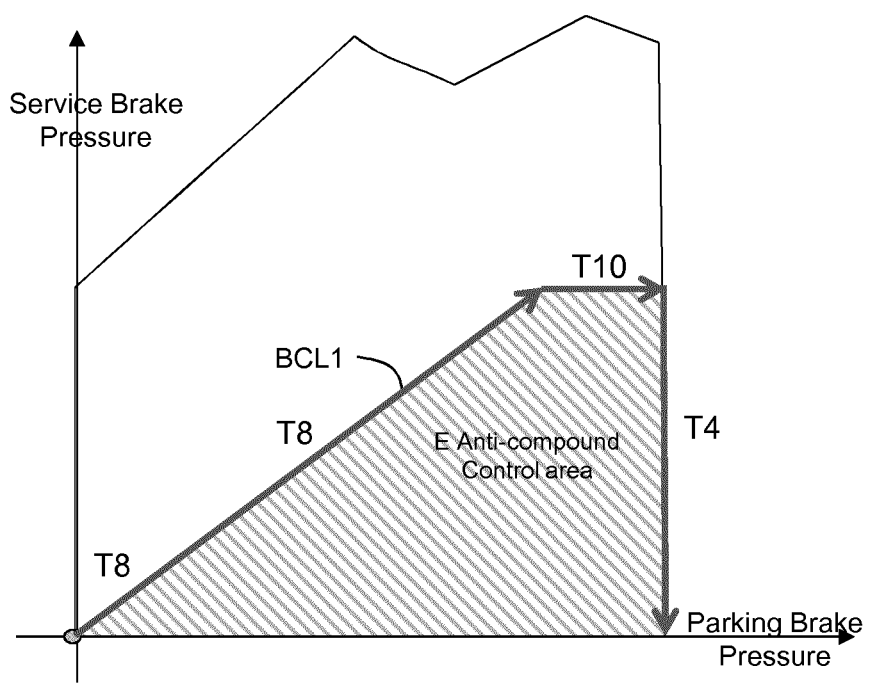

FIGS. 5A and 5B illustrate the border compound control law BCL1, respectively for a transition from a park brake released state to a park brake applied state, or conversely, for a transition from a park brake applied state to a park brake released state.

When acting during a transition, where the brake force should be maintained, the "E-anti-compound" function avoids installing a transitory additional brake force compare to needed one, the E-anti-compound function avoids any loss of brake force which could lead to an involuntary movement of the vehicle.

At the right of vertical line denoted 68 at FIG. 3, there is provided the drive domain area denoted DCL. In the drive domain DCL, the park brake pressure PBR is such that no effort is exerted by the park brake section of the actuator on the rod coupled to the caliper. In the drive domain though, it is possible to apply the park brake as an emergency brake and/or as an alternate braking feature whenever the service brake cannot be operated properly, for any reason.

There is provided a second compound control law CL2 defined by the service brake pressure SB being electronically controlled depending on the parking brake pressure PBR, such that the resulting total braking force F does not exceed the second upper limit UL2. The second compound control law CL2 is known as "controlled-compound" mode.

There is also provided a third compound control law CL3 defined by the service brake pressure SB is electronically controlled such that the resulting braking force F remains below the third upper limit UL3. The third compound control law CL3 is known as a "low anti-compound" mode.

This "low anti-compound" mode is typically used for short term stops (i.e. "work brake" in the truck driver language). This "low anti-compound" is only allowed if the parking place exhibits a flat ground or nearly flat ground, since the braking requirement is decreased with regard to regulatory braking requirement.

Here, we note that for short term stops with activation of this "low anti-compound", it can be preferred to use only service brake and not using park brake; this is illustrated by arrow 69 where PBR remains pressurized, while only service brake is changed, i.e. increase up to reaching UL3 limit.

There are two reasons to use service brake instead of parking brake in specific circumstances (work stop, traffic light holder, start&stop stops, etc. . . . ):
- the compressed air consumption is less for service brake than for parking brake, thereby decreasing overall consumption and environmental footprint,
- the service brake is faster to react than parking brake, for application as well as for release.

The control of service brake pressure SB is performed through software and the circumstantial selection of one control law among the above mentioned set of control laws takes into account various operating and environmental conditions including at least vehicle speed, ground slope at parking place, temperature and wind conditions, and optionally load of the tractor and/or load of the carrier and/or load of the trailer.

The information relative to the parking brake pressure PBR is measured dynamically and directly via a dedicated sensor denoted 71.

Alternately, the parking brake pressure PBR can be determined from pre-registered look-up tables or abacus, in accordance with the PB application sequence or PB release sequence.

The parking brake pressure PBR is first determined, either directly measured or indirectly assessed.

There is be provided, stored in a memory of one of the control unit, a first calibration function FSP=F1 (PBR) representing the force exerted by the main spring as a function of parking brake pressure (PBR).

There may exist a hysteresis in the park brake mechanism. In this case, there are two curves, namely curve 63 and curve 64, each for a direction, i.e. either during increase of PBR [release of PB] or during decrease of PBR [application of PB]. In this case also, the function F1 may be split accordingly into two sub-functions F1a (curve 63) and F1b (curve 64).

The curves may be defined by calibration function and this definition can rely on look-up table, individual calibration, self/deep-learning, auto-calibrating process, etc. . . . .

The control of the parking brake pressure PBR can also be performed through software.

However, the parking brake pressure PBR is controlled directly by the driver by means of the manual control device 51. This means that the parking brake pressure (PBR) only depends on the state of the manual control device 51, the PBR is mechanically or pneumatically controlled. This is compatible with the first and second compound control laws, Further, there is be provided, stored in a memory of one of the control unit, a second calibration function FSB=F2 (SB) representing the force exerted by the service brake chamber as a function of the service brake pressure SB.

As per F1, F2 can be defined by calibration process. F2 is not illustrated at the figures. F2 can also exhibit non-linearities and hysteresis.

The service brake pressure SB is measured by a pressure sensor denoted 72.

The logic may proceed as follows: the parking brake pressure PBR is first determined, then the force exerted by the main spring with the function FSP is determined therefrom. Afterwards, a remaining effort up to the currently prevailing limit (UL1,UL2,UL3) is determined, and a maximum service brake pressure SB is then computed with the function FSB.

For the first compound control law CL1, maximum value for service brake denoted SB1max is calculated as follows: SB1max=F2$^{-1}$ [UL1−F1 (PBR)].

For the second compound control law CL2, maximum value for service brake denoted SB2max is calculated as follows: SB2max=F2$^{-1}$ [UL2−F1 (PBR)].

For the third compound control law CL3, maximum value for service brake denoted SB3max is calculated as follows: SB3max=F2$^{-1}$ [UL3−F1 (PBR)].

In a simplified configuration, SB1max is calculated as follows:

SB1max=$KA \cdot PBR+KC$.

Under the first border compound control law BCL1, the service brake pressure can be calculated, as the first order, as follows: SB(t)=KA×PBR(t)+KC The second compound control law CL2 is selected if the foot brake pedal is depressed beyond a predetermined threshold TH1.

Therefore, for example, if the driver happens to stop the truck on a steep slope, with a loaded truck, the parking brake alone may be not strong enough to keep the truck completely still. The truck driver therefore will naturally depressed the foot brake pedal. When the foot brake pedal is depressed beyond a predetermined threshold TH1, then the second compound control law CL2 is selected to increase the braking force.

The predetermined threshold TH1, may be defined in term of mechanical range of the pedal or pressure range.

In this case, addition of parking brake force and service brake with foot pedal depressed allows maintaining the truck completely still, before the truck driver moves the truck to place where the slope is smaller.

The first compound control law CL1 is selected again when the service brake applied by the driver is released. In one example the first compound control law CL1 (anti-compound) is selected again when the service brake is completely released. In another example, the first compound control law CL1 is selected again after a predefined time-out.

Preferably, the first compound control law CL1 is selected only when the vehicle is at standstill or when the vehicle speed is below a speed threshold.

According to another embodiment, the method can be defined in a generalized manner, and may comprise:
/Z1/—determine a current upper limit UL(t) of the total braking force F applied to the brake caliper, admissible according to current circumstances,
/Z2/—determine a current parking brake pressure PBR,
/Z3/—determine a force exerted by the main spring as a function of parking brake pressure PBR,
//Z4/—determine a remaining effort up to the prevailing current upper limit UL(t),
/Z5/—determine a current maximum service brake pressure (SB) such that the resulting total braking force (F) does not exceed the currently prevailing upper limit UL(t),
/Z6/—limit the service brake pressure SB with the current maximum service brake pressure SB.

Therefore, there is not only 3 limits but an infinity of limits, which are calculated according to a large number of parameters, including wear and ageing of the braking system, or parameters set by a fleet manager in charge of the truck.

Figure 4:
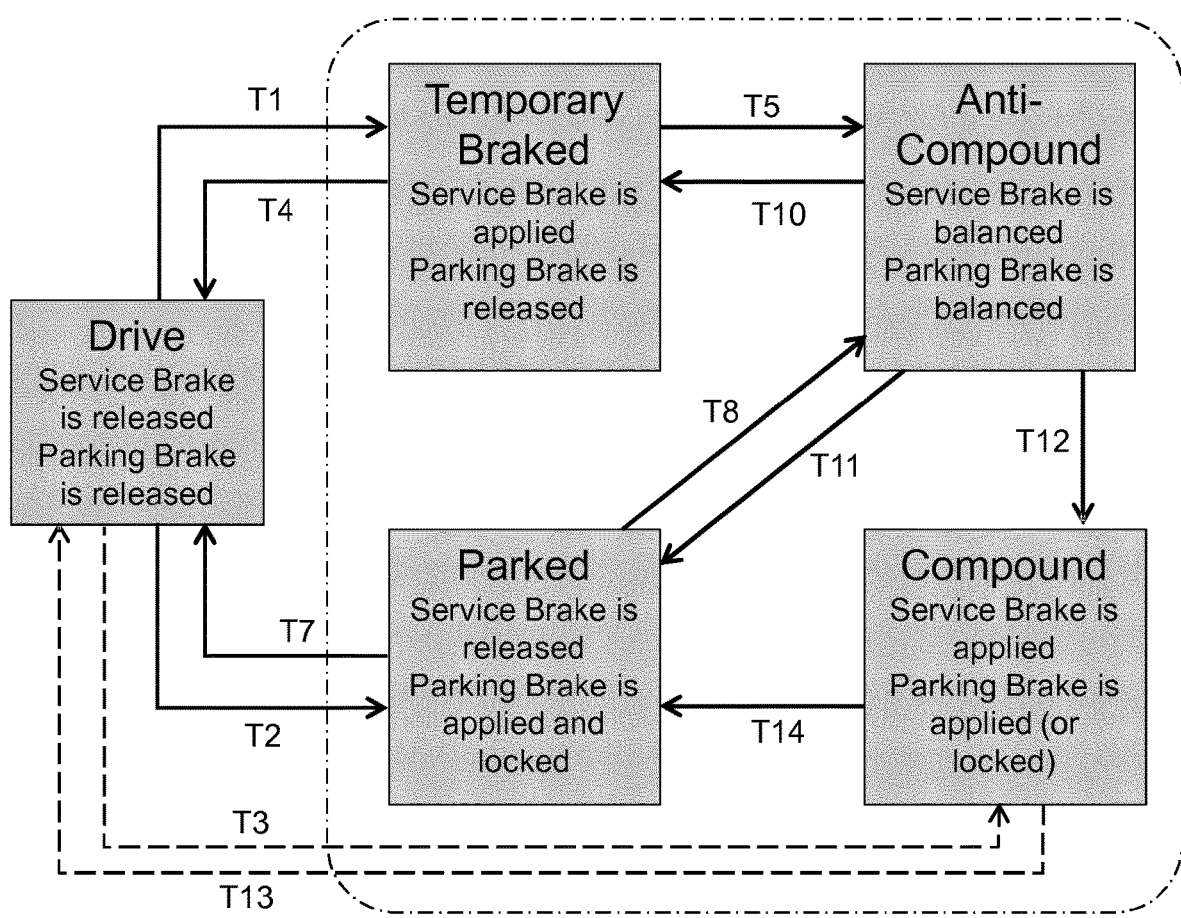
FIG. 4 is a state-chart illustrating the behavior and various transitions.

Transitions Definitions (FIG. 4)

In FIG. 4, there are provided an exemplary chart illustrating states and transitions.

Transition 1—from Drive to Temporary braked

The service brake pressure is increased in accordance with the needed deceleration. The vehicle may decelerate to standstill.

Transition 2—from Drive to Parked

The vehicle is standstill, e.g. on a flat ground, and the parking brake is applied and locked accordingly to request.

Transition 3—from Drive to Compound

The vehicle is running for some reason (emergency or fallback following detection or a malfunction on the service brake function) park brake is switched into "controlled compound" function. The parking brake force is applied following brake pedal request or electronic backup control and service brake force is applied independently of the parking brake force. This could lead to an accepted and controlled compound situation.

Transition 4—from Temporary braked to Drive

The service brake force is released in accordance with the brake request. This transition leads to an axle brake force decrease.

Transition 5—from Temporary braked to anti-compound

The parking brake force is applied to achieve a defined balanced target force. The service brake force is balanced in accordance with the parking brake force ramp-up.

This transition leads to an axle brake force increase or at least maintained (following BCL1 curve). This transition must limit or avoid the transitory compound effect.

Transition 7—from Parked to Drive

The parking brake force is released according to request. This transition leads to an axle brake force decrease.

Transition 8—from Parked to Anti-compound

The parking brake force is applied to achieve a defined balanced target force. The service brake force is balanced in accordance with the parking brake force decrease. This transition leads to an axle brake force increase or at least maintained (following BCL1 curve). This transition must limit or avoid the transitory compound effect.

Transition 10—from Anti-compound to Temporary braked

Parking brake force is released to allow a future take off of the vehicle. This transition leads to an axle brake force decrease.

Transition 11—from Anti-compound to Parked

Parking brake force is increased up to a maximum brake force and the Parking brake is locked to an applied status wherein full parking brake force is applied. The service brake force is decreased in accordance to parking brake force ramp-up (following BCL1 curve). This transition avoids temporary loss of axle brake force. This transition leads to an axle brake force increase or decrease depending on the precedent level of balanced brake force applied.

Transition 12—from Anti-compound to Compound

The parking brake force is fully applied and Service Brake is activated beyond the threshold TH1. This may follow a loss of control, with a parking brake already balanced.

Alternatively, the service brake force is applied over the balanced value.

This transition leads to an axle brake force increase and compound effect.

Transition 13—from Compound to Drive

Parking brake force and service brake forces are released independently and according to the driver request.

This transition leads to an axle brake force decrease

Transition 14—from Compound to Parked

The service brake force is decreased in accordance to the driver request or following a service brake control Mode. Miscellaneous Same logic is applied for all park brake actuator(s) (whatever the number of such actuators), with common calculation or specific calculation for each type or even for each individual park brake actuator.

It is assumed that when the parking brake is applied and locked, the brake force installed complies with the legal performance required.

Regulatory park brake requirement generally requires a safe stop on 20% slope (USA market) or 15% slope for other markets.

In one embodiment, the force exerted by the main spring 92 is equivalent to SB at 6 bars in the second chamber.

In one embodiment, service brake maximum pressure SB max is about 10 bars.

In practice, first and second air supply circuits AC1,AC2, may have a service pressure comprised in the range [5 bars-15 bars], preferably comprised in the range [7 bars-12 bars].

The invention claimed is:

1. A control method for controlling a spring loaded brake actuator comprising a first chamber to receive a parking brake pressure acting against a main spring exerting a parking brake force, and a second chamber to receive a service brake pressure for applying a service brake force, the spring loaded brake actuator being configured to apply a total braking force to a brake caliper which is the sum of the service brake force and the parking brake force, the method comprising a circumstantial selection of one control law among a set of control laws comprising at least first and second compound control laws:

where the first compound control law, known as anti-compound mode, is such that at least the service brake pressure is electronically controlled such that the resulting total braking force does not exceed a first upper limit corresponding to the force of the main spring when the parking brake pressure is substantially null, where the second compound control law, known as controlled-compound mode, is such that at least the service brake pressure is electronically controlled such that the resulting total braking force does not exceed a second upper limit higher than the first upper limit.

2. The control method according to claim 1, further comprising a first border compound control law for a transition from a park brake released state to a park brake applied state or for a transition from a park brake applied state to a park brake released state, where the parking brake pressure and the service brake pressure are balanced such that the total braking force equals the first upper limit corresponding to the force of the main spring when the parking brake pressure is substantially null.

3. The control method according to claim 1, wherein the set of control laws further comprises a drive domain control law wherein the service brake pressure is controlled with no dependence from the parking brake pressure, the drive domain control law being selected when the vehicle is under normal driving conditions.

4. The control method according to claim 1, the set of control laws further comprises:

a third compound control law, wherein at least the service brake pressure is electronically controlled such that the resulting braking force remains below a third upper limit lower than the first upper limit.

5. The control method according to claim 1, wherein the control of the service brake pressure is performed through software and the circumstantial selection of one control law among the set of control laws takes into account various operating and environmental conditions including at least one of the following parameters:

vehicle speed,
ground slope at parking place,
temperature, and
wind conditions.

6. The control method according to claim 5, the control of the parking brake pressure is also performed through software.

7. The control method according to claim 5 wherein the circumstantial selection of one control law among the set of control law takes into account load of a tractor and/or load of a carrier and/or load of a trailer.

8. The control method according to claim 1, wherein the circumstantial selection of one control law among the set of control laws is performed in a real-time fashion, with a decision making process taking less than 1 second.

9. The control method according to claim 8 wherein the decision-making process takes less than 0.5 seconds.

10. The control method according to claim 1, wherein there is provided, stored in a memory, a first calibration function FSP=F1 representing the force exerted by the main spring as a function of parking brake pressure.

11. The control method according to claim 1, wherein there is provided, stored in a memory, a second calibration function FSB=F2 representing the force exerted by a service brake chamber as a function of the service brake pressure.

12. The control method according to claim 1, wherein the parking brake pressure is first determined, either directly measured or indirectly assessed, then the force exerted by the main spring as a function of parking brake pressure is determined therefrom, and then a remaining effort up to the currently prevailing limit is determined, and then a maximum service brake pressure is computed therefrom.

13. The control method according to claim 1, wherein the second compound control law is selected only if a foot brake pedal is depressed beyond a predetermined threshold.

14. The control method according to claim 1, wherein the first compound control law is selected only when the vehicle is at standstill or when the vehicle speed is below a speed threshold.

15. The control method according to claim 1, wherein the parking brake pressure is controlled by a first control entity and the service brake pressure is controlled either by the same first control entity or by a further control entity.

16. The control method according to claim 15, wherein the first control entity is hosted in an Electronic Parking Brake control unit of a heavy duty vehicle, and the further control entity is hosted in an EBS control unit.

17. The control method according to claim 15 wherein the further control entity is hardware-wise independent from the first control entity.

18. A braking system for controlling a spring loaded brake actuator comprising a first chamber to receive a parking brake pressure acting against a main spring exerting a parking brake force, and a second chamber to receive a service brake pressure for applying a service brake force, the spring loaded brake actuator being configured to apply a total braking force to a brake caliper which is the sum of the service brake force and the parking brake force, and at least a control unit, the control unit being configured to select of one control law among a set of control laws comprising at least first and second compound control laws:
- where the first compound control law, known as anti-compound mode, is such that the parking brake pressure and the service brake pressure are controlled such that the resulting total braking force does not exceed a first upper limit corresponding to the main spring force,
- where the second compound control law, known as controlled-compound mode, is such that the parking brake pressure and the service brake pressure are controlled such that the resulting total braking force does not exceed a second upper limit higher than the first upper limit.

19. The braking system according to claim 18, wherein the parking brake pressure is controlled by a first control unit, and the service brake pressure is controlled by the same control unit.

20. The braking system according to claim 18, wherein the parking brake pressure is controlled by a first control unit, and the service brake pressure is controlled by a further control unit logic.

21. The braking system according to claim 20 wherein the further control unit logic is hardware-wise independent from the first control unit logic.

22. The braking system according to claim 18, further comprising a pressure sensor for sensing parking brake pressure.

23. The braking system according to claim 22 further comprising a second pressure sensor for sensing the service brake pressure.

24. A Vehicle comprising a braking system according to claim 18.

* * * * *